J. VAN DENBURG.
CLAMP.
APPLICATION FILED JAN. 29, 1912.
1,036,386.
Patented Aug. 20, 1912.
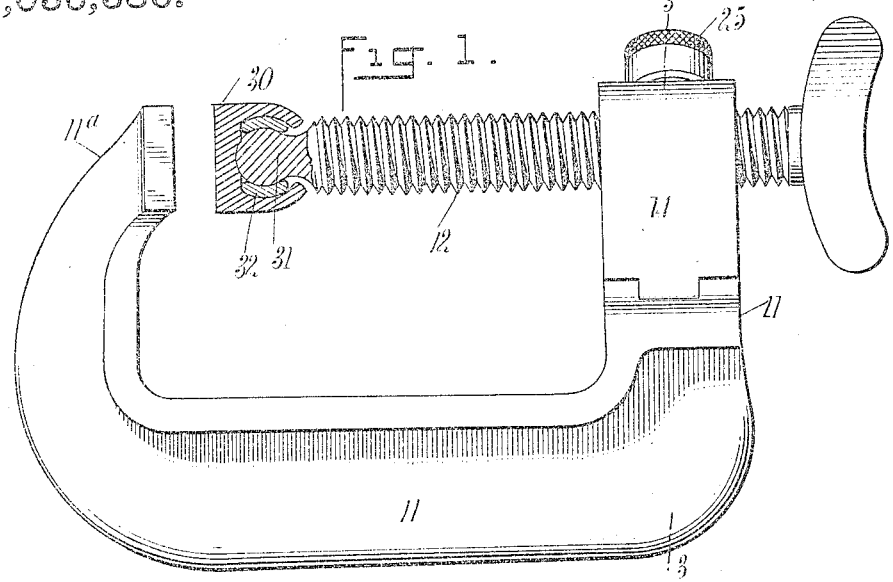
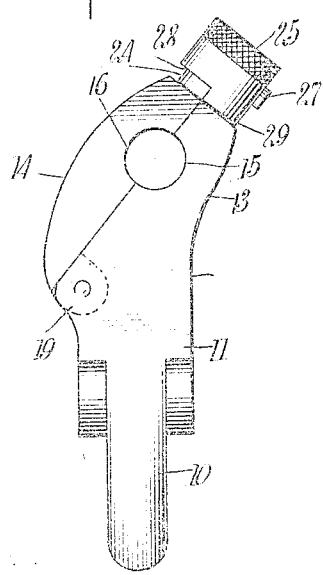
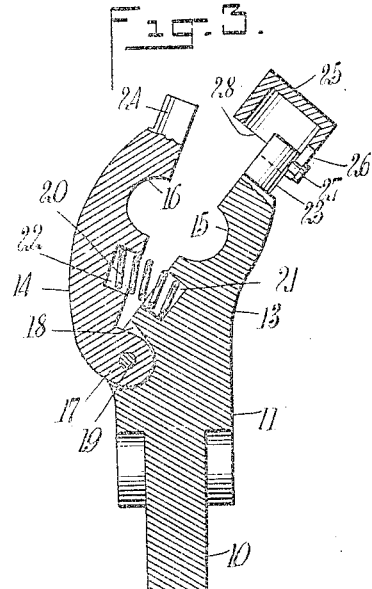
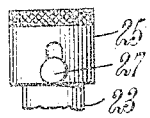
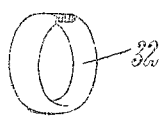
WITNESSES
INVENTOR
Jesse Van Denburg
BY Munn & Co.
ATTORNEYS

UNITED STATES PATENT OFFICE.

JESSE VAN DENBURG, OF CORTLAND, NEW YORK.

CLAMP.

1,036,386.

Specification of Letters Patent.

Patented Aug. 20, 1912.

Application filed January 29, 1912. Serial No. 673,960.

*To all whom it may concern:*

Be it known that I, JESSE VAN DENBURG, a citizen of the United States, and a resident of Cortland, in the county of Cortland and State of New York, have invented a new and Improved Clamp, of which the following is a full, clear, and exact specification.

The invention relates to clamps used mainly by joiners, and comprising a substantially U-shaped frame, with a thumb screw mounted in one arm of the frame and movable toward and from the other arm. In my invention the arm carrying the screw has a special formation to constitute a split nut, so that the screw may be removed instantly and replaced to adjust it approximately to the work being clamped, the tightening of the screw being then effected by turning in the usual manner. In this way the screw can advantageously have a fine thread, since a quick movement is not necessary after the approximate bodily adjustment. In connection with the screw I also provide an improved form of swiveled head.

The invention will be particularly described in connection with the illustrated example defined in the claims.

Reference is to be had to the accompanying drawings forming a part of this specification, in which similar characters of reference indicate corresponding parts in all the figures.

Figure 1 is a side elevation of the clamp embodying my invention, the head of the screw being shown in section; Fig. 2 is a rear end view of the clamp without the screw; Fig. 3 is a transverse vertical section on the line 3—3 of Fig. 1, the screw being omitted; Fig. 4 is a fragmentary side view of the sliding cap for holding the split nut in a closed position; and Fig. 5 is a perspective view of the split ring employed to provide a bearing surface within the swiveled head of the screw.

In forming a clamp in accordance with my invention the body 10 is of general U-shape as in similar clamps, and in one arm 11 thereof the thumb screw 12 is mounted for axial movement toward and from the opposed arm 11ª, or other fixed clamp member to coöperate with the arm. The arm 11 is divided on a line preferably inclined to the general plan of the clamp, to constitute the split nut, which consists of a fixed integral member 13, and a hinged member 14, said members being formed with mating recesses 15, 16, which in the closed position of the members constitute a threaded eye for the screw 12. The connection between the hinged member 14 and the fixed member 13 may be effected as shown, by forming a reduced hinge lug 17 on the member 14 and a corresponding recess 18 in the fixed member, or vice versa, the hinge pin 19 completing the connection.

A spring is provided, normally tending to open the split nut, and advantageously at a point between the thumb screw 12 and the hinge pin 19. The preferred form consists of an expansive helical spring 20, the ends of which are seated in opposed pockets 21, 22, formed respectively in the fixed and the hinged members of the split nut.

To effectively carry out the purpose of my invention it is of importance that the split nut be opened and closed with despatch for the quick entrance and removal of the thumb screw, and to this end I provide a special arrangement for holding the hinged member of the split nut in the closed position and permitting its quick release. It will be observed that the members 13, 14, terminate at the upper ends in reduced projections 23, 24, preferably of such a form that when brought together in a closed position of the split nut, they will constitute the halves of a divided round stud, over which fits a sliding cap 25, which has a slot 26 through which passes a headed stud 27 carried on the terminal projection 23, the arrangement being such that the cap has a limited movement outward and inward on its supporting terminal 23.

It will be observed from Figs. 2 and 3, that the cap 25 is cut away at the bottom at the side toward the projection 24 of the hinged member 14, as at 28, so that at the mentioned side it has a reduced height, the purpose of which is to allow the longer end 29 to rest on the member 13 at the base of the terminal projection 23, and while the opposite reduced stud sufficiently overlaps the opposite projection 24, to hold the hinged member 14 of the split nut in the closed position; but at the same time only a slight outward movement of the cap is necessary to release the split nut.

In connection with the swiveled head 30 of the screw, and between the same and the usual round end 31 of the screw, I provide a split ring 32, which provides a removable wear surface, and which may be sufficiently hard to withstand wear. The construction also permits the removal of the split lining and its ready renewal.

By providing a split nut with the line of separation between the members disposed at an angle to the general plane of the frame, I am enabled to preserve the essential strength of the frame so that no real weakening results from the provision of the split nut. Thus it will be observed that the integral member 13, at its base and at the point at which the hinged member 14 is secured, is substantially the full width of the arm 11, and that the said member 13 has substantial width up to the threaded recess which receives the screw, so that the said member 13 has no material reduction in strength except at points adjacent to the screw, and that the strain of the screw on the reduced parts of the clamp is exerted through a short leverage, so to speak; whereas if the members of the split nut had a line of separation parallel with the general plane of the frame, it is obvious that there would be two members of reduced width extending almost to the base of the arm 11, and on which the strain of the screw would be exerted through a long leverage, and thus the advantage of the inclined line of separation will be apparent; moreover, by utilizing a fixed member of the frame as one of the elements of the split nut, convenience is promoted in placing and replacing the screw, since the frame may be held, when manipulating the screw, in such a manner as to afford support for the latter, and give the screw less tendency to fall out of the frame when the hinged member of the split nut is released.

Having thus described my invention, I claim as new, and desire to secure by Letters Patent,—

1. A clamp, comprising a frame having members thereon constituting a split nut, one of said members being integral with the frame and the other hinged to move toward and from the said fixed member, and a clamp screw held by the split nut, the line of separation between the fixed and movable members of the split nut being inclined to the plane of the clamp.

2. A clamp comprising a frame presenting two arms one of which is divided on a line at an angle to the plane of the frame to constitute a split nut, and a clamp screw held by the said split nut.

In testimony whereof I have signed my name to this specification in the presence of two witnesses.

JESSE VAN DENBURG.

Witnesses:
 JENNIE A. KINNEY,
 HENRY A. DICKINSON.